(12) United States Patent
Rao et al.

(10) Patent No.: US 11,756,339 B2
(45) Date of Patent: Sep. 12, 2023

(54) VIDEO ANALYTICS SYSTEM FOR DWELL-TIME DETERMINATIONS

(71) Applicant: NEC Laboratories America, Inc., Princeton, NJ (US)

(72) Inventors: Kunal Rao, Monroe, NJ (US); Utsav Drolia, Milipitas, CA (US); Murugan Sankaradas, Dayton, NJ (US); Srimat Chakradhar, Manalapan, NJ (US)

(73) Assignee: NEC Corporation

(*) Notice: Subject to any disclaimer, the term of this patent is extended or adjusted under 35 U.S.C. 154(b) by 310 days.

(21) Appl. No.: 17/178,507

(22) Filed: Feb. 18, 2021

(65) Prior Publication Data

US 2021/0264165 A1 Aug. 26, 2021

Related U.S. Application Data

(60) Provisional application No. 62/979,534, filed on Feb. 21, 2020.

(51) Int. Cl.

| G06K 9/00 | (2022.01) |
|---|---|
| G07C 1/10 | (2006.01) |
| G06N 3/04 | (2023.01) |
| G06V 20/52 | (2022.01) |
| G06V 40/16 | (2022.01) |
| G06V 10/764 | (2022.01) |

(52) U.S. Cl.
CPC .............. *G07C 1/10* (2013.01); *G06N 3/04* (2013.01); *G06V 10/764* (2022.01); *G06V 20/53* (2022.01); *G06V 40/16* (2022.01); *G06V 40/166* (2022.01); *G06V 40/169* (2022.01); *G06V 40/172* (2022.01)

(58) Field of Classification Search
CPC . G07C 1/10; G06N 3/04; G06N 3/045; G06V 10/764; G06V 20/53; G06V 40/16; G06V 40/166; G06V 40/169; G06V 40/172
See application file for complete search history.

(56) References Cited

U.S. PATENT DOCUMENTS

| 9,740,083 | B1* | 8/2017 | Hennings | ............... H04N 23/56 |
| 11,157,929 | B1* | 10/2021 | Eby | .................... G06Q 30/0205 |
| 2014/0313330 | A1* | 10/2014 | Carey | ............. G08B 13/19608 |
| | | | | 348/143 |
| 2020/0004885 | A1* | 1/2020 | Bastide | ................ G06F 16/248 |
| 2021/0081657 | A1* | 3/2021 | Zhang | ................... G06F 18/213 |
| 2021/0216753 | A1* | 7/2021 | Gefen | .................... G06V 20/49 |
| 2021/0390287 | A1* | 12/2021 | Rozner | ............... G06V 40/173 |

FOREIGN PATENT DOCUMENTS

KR 10-1841882 B1 5/2018

* cited by examiner

*Primary Examiner* — Dhaval V Patel
(74) *Attorney, Agent, or Firm* — Joseph Kolodka

(57) ABSTRACT

Systems and methods for determining dwell time is provided. The method includes receiving images of an area including one or more people from one or more cameras, and detecting a presence of each of the one or more people in the received images using a worker. The method further includes receiving by the worker digital facial features stored in a watch list from a master controller, and performing facial recognition and monitoring the dwell time of each of the one or more people. The method further includes determining if each of the one or more people is in the watch list or has exceeded a dwell time threshold.

18 Claims, 10 Drawing Sheets

VIDEO ANALYTICS SYSTEM FOR DWELL-TIME DETERMINATIONS

RELATED APPLICATION INFORMATION

This application claims priority to Provisional Application No. 62/979,534, filed on Feb. 21, 2020, incorporated herein by reference in its entirety.

BACKGROUND

Technical Field

The present invention relates to a video monitoring system and more particularly a video analytics system that monitors an area to determine a dwell time for individuals in the area.

Description of the Related Art

Video systems have been used to monitor areas, such as bank and business lobbies, and federal buildings by collecting and saving video streams from cameras. Motion detection can be used to reduce the amount of data to be recorded by turning cameras and recordings on and off. Large and complex security camera systems can utilize large network bandwidth.

Facial recognition systems can attempt to identify faces from digital images using a database of faces. Particular facial features may be located and used to match facial features in the saved images. An algorithm may analyze the relative position, size, and/or shape of different facial features for identification.

SUMMARY

According to an aspect of the present invention, a computer implemented method for determining dwell time is provided. The method includes receiving images of an area including one or more people from one or more cameras, and detecting a presence of each of the one or more people in the received images using a worker. The method further includes receiving by the worker digital facial features stored in a watch list from a master controller, and performing facial recognition and monitoring the dwell time of each of the one or more people. The method further includes determining if each of the one or more people is in the watch list or has exceeded a dwell time threshold.

According to another aspect of the present invention, a system for dwell time determination is provided. The system includes a master controller having one or more processors and memory, the master controller including a watch list and an alerts manager stored in the memory, and a worker having one or more processors and memory, wherein the worker includes a dwell time calculator and a facial recognition neural network executable by the one or more processors. The system further includes a plurality of cameras in communication with the worker, wherein the worker receives video images from the plurality of cameras and performs facial recognition and dwell time calculations for each of one or more people detected in a field of view of each of the plurality of cameras, wherein the worker receives images of an area including one or more people from the plurality of cameras, and performs facial recognition and monitoring of a dwell time for each of the one or more people.

According to yet another aspect of the present invention, a non-transitory computer readable storage medium comprising a computer readable program for producing a neural network for anomaly detection is provided. The computer readable program when executed on a computer causes the computer to perform receiving images of an area including one or more people from one or more cameras; detecting a presence of each of the one or more people in the received images using a worker; receiving by the worker digital facial features stored in a watch list from a master controller; performing facial recognition and monitoring the dwell time of each of the one or more people; and determining if each of the one or more people is in the watch list or has exceeded a dwell time threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for distributed, real-time, computation of dwell-time of individuals in a particular region/area, and recognition of certain individuals using facial recognition. For example, there can be real-time computation of a dwell-time of individuals around a particular car in a car dealership, and/or recognition of Do Not Admit (DNA) or Very Important Person (VIP) customers. In various embodiments, the system/method can be scalable across multiple cameras and multiple processing machines connected via a network, e.g., LAN/WAN.

In various embodiments, a distributed streaming video analytics system, which draws video feed(s) from one or more cameras in one or more regions/areas, can perform facial detection and recognition on the digital video frames received from the cameras, and determine how long the person has been staying in the area/section by computing a dwell time for the individuals. The video analytics system can also recognize individuals in a Watchlist(s) using the facial recognition. In various embodiments, the video analytics system can include a Watchlist management capability to dynamically add/update/remove/search/merge people in the Watchlist(s) and also to dynamically turn ON/OFF monitoring for individuals in the Watchlist(s).

It is to be understood that aspects of the present invention will be described in terms of a given illustrative architecture; however, other architectures, structures, arrangements and process features and steps can be varied within the scope of aspects of the present invention.

Figure 1:
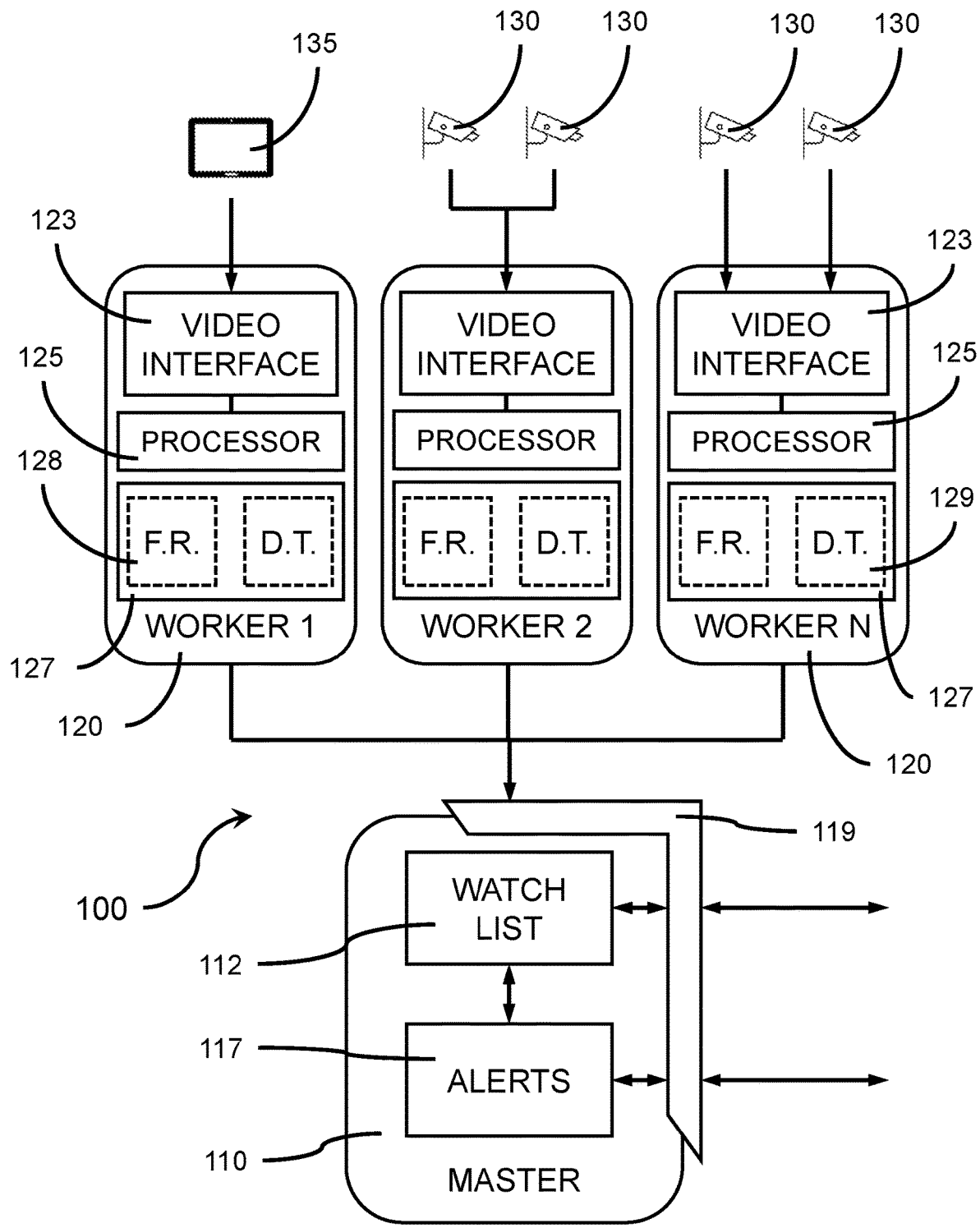
FIG. 1 is a block/flow diagram illustrating a distributed streaming video analytics system and method for computation of dwell-time and facial recognition of individuals, in accordance with an embodiment of the present invention.

Referring now in detail to the figures in which like numerals represent the same or similar elements and initially to FIG. 1, a high-level system/method for distributed, real-time, computation of dwell-time and facial recognition of individuals is illustratively depicted, in accordance with one embodiment of the present invention.

In an embodiment, a. distributed, real-time, video analytics system 100 can include a master controller 110 and one or more distributed workers 120, where each of the one or more distributed workers 120 can communicate with the master controller 110 over a communication path. The distributed workers 120 can perform a number of functions locally to reduce a processing load on a central Master controller 110, and additional workers can be added to the system to make the system scalable.

In various embodiments, the master controller 110 can include a processor, memory, and one or more databases that can store a watch list 112 and an alerts record 117. The master controller 110 can include a communications interface 119 to interface with and provide communication with one or more workers 120, as well as remote third parties. The watch list 112 can store records for individual people, including facial images and captured features, for later identification of people captured by the camera(s) 130, or cameras associated with personal computing devices 135.

In various embodiments, the worker(s) 120 can include a video interface 123, a processor 125, and memory 127 configured to perform facial recognition 128 and/or dwell time calculations 129. The workers 120 can be personal computing devices 135, for example, smart phones, tablets, and laptop computers, that have a camera and communication capability, and/or computers, for example, desktop computers and servers that may remain in a fixed location during operation. Depending on the computational resources available on workers 120, single or multiple video stream(s) can be handled by each worker, for example, a tablet or smart phone may only utilize a built-in camera, where only a single video stream is received and processed by the worker; whereas a server may be in communication with one or more independent cameras 130, including several cameras monitoring the same or different areas. The video streams may be received by a worker serially or in parallel, where for example, a packet communication system over Ethernet to a single input port or a local area network (LAN) may be a serial communication path, whereas an optical transmission simultaneously over multiple frequencies (e.g., wavelength division multiplexing (WDM)) and/or orthogonal frequency-division multiplexing (OFDM) can provide a parallel communication path).

In various embodiments, the master controller 110 can be interfaced with a plurality of workers 120 (i.e., 2 to N workers) through the communications interface 119. The communications interface 119 can also interface the master 110 with one or more remote and/or third parties, for example, a home office, sales desk, the local police, Federal Bureau of Investigation (FBI), Transportation Security Administration (TSA), Homeland Security, etc.

In various embodiments, a Master controller 110 handles Watchlist management and Alerts management, while workers do the actual computation(s) for dwell time of individuals and recognition of individuals in the Watchlist(s). The worker(s) 120 can include a neural network trained to identify individuals through facial recognition, and a monitoring program configured to identify objects in a field of view and track movement within and between areas. In various embodiments, the facial recognition determinations and dwell-time calculations can be performed by a worker in parallel, where the worker has sufficient memory and processing power. In various embodiments, a usecase is a collection of applications, that are chained together in some manner to form a topology.

In various embodiments, facial recognition can be performed using a neural network trained to identify the faces in one or more watch lists, where the neural network can be a convolutional neural network (CNN). A common detection library of facial images can be used to match faces, where the neural network can be pre-trained to identify faces. The facial images, for example, from the detection library, and images that are not in the watch lists can be used as the training set for the neural network performing facial recognition, or the neural network can be a student network trained by a teacher network that was trained using facial images not in the watch list, were images not used for training can be used as a test set for the student neural network.

Figure 2:
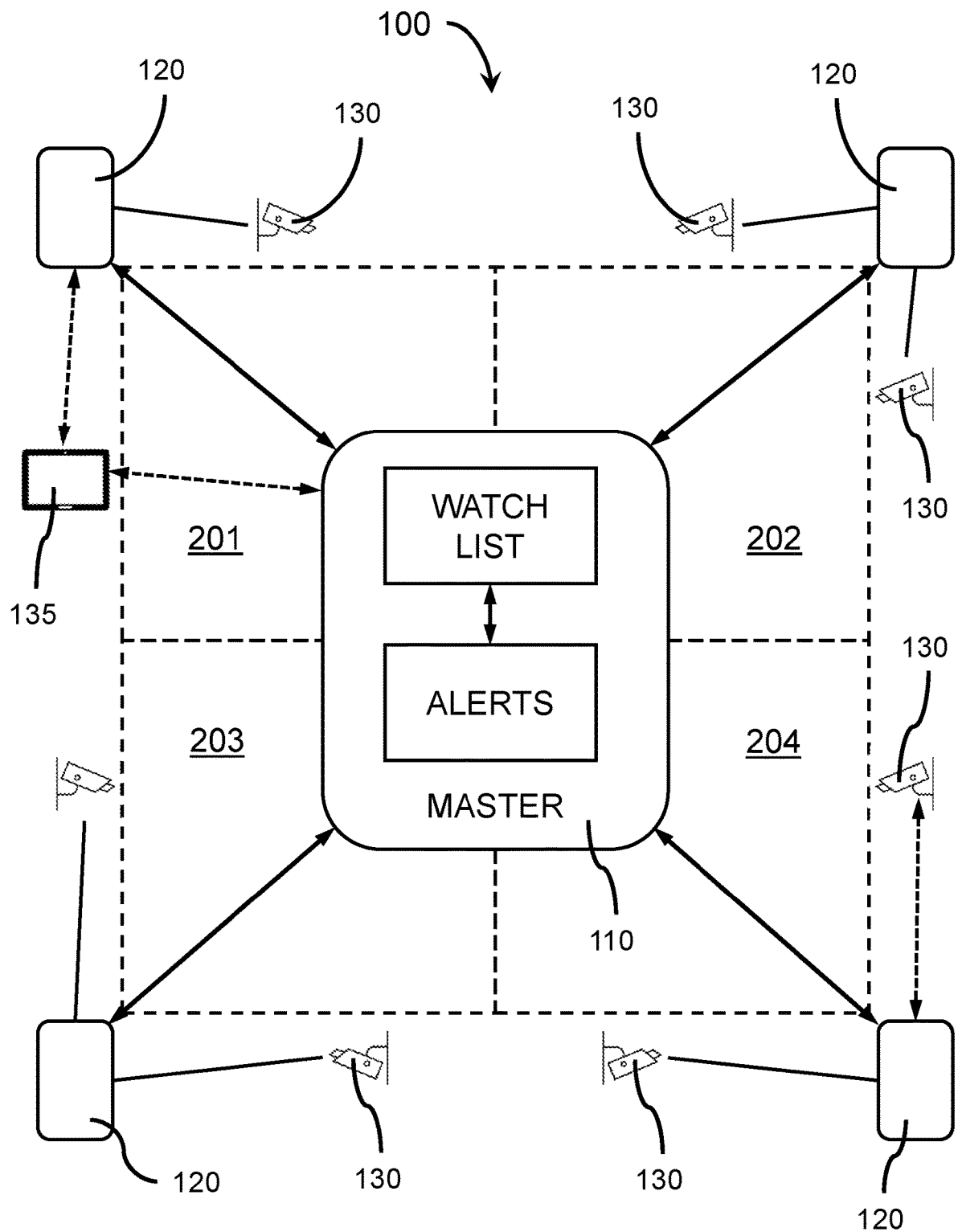
FIG. 2 is a block/flow diagram illustrating a distributed streaming video analytics system and method applied to multiple regions/areas of interest, in accordance with an embodiment of the present invention.

FIG. 2 is a block/flow diagram illustrating a distributed streaming video analytics system and method applied to multiple regions/areas of interest, in accordance with an embodiment of the present invention.

In various embodiments, one or more cameras and/or personal computing devices 135 having camera(s) can be deployed to cover a particular region/area 201, 202, 203, 204 that a user wishes to monitor with a distributed video analytics system 100. The cameras 130 can be grouped according to the particular region/area 201, 202, 203, 204 being monitored, such that cameras monitoring the same designated area (e.g., 202) are recognized as being in the same group (also referred to as a section), and the grouped cameras may all be in communication with the same worker 120, or can include one or more personal computing device(s) 135 recognized as being in the same group and monitoring the same area. The communication with the worker can be wired or wireless. A section can be the worker and cameras assigned to monitor the same area.

In various embodiments, each of the workers 120 can be in communication with the master controller 110. A personal computing device 135 may communicate directly with the master controller 110 or may be linked with other cameras for a section through a specified worker 120. In various embodiments, each of the workers 120 and/or personal computing devices 135 can be linked to and in communication with the master controller 110 over a network, for example, a local area network (LAN), wide area network (WAN), a metropolitan area network (MAN), the Internet, etc.

In various embodiments, the region/area 201, 202, 203, 204 can be a predefined area or region, where the area can be defined by physical boundaries that block the field of view of the camera(s) 130, 135, for example, opaque walls, physical objects that form demarcations between different areas without blocking line-of-sight, for example, fencing or glass partitions and glass doors, the edge of the field of view of the camera(s) themselves, or a combination thereof. The region/area 201, 202, 203, 204 can also be a predefined through software/computer processing that identifies a range of pixels excluded from a monitored area. Such software/computer processing can define Regions-of-Interest (ROI), where, for example, the system (e.g., workers 120) do not use processing resources to identify and monitor objects because objects are not expected to be in the portion of the image. For example, people are not expected to be lingering on ceilings or tall vertical walls, so portions of the field of view from the camera(s) capturing such places can be excluded from processing using a Regions-of-Interest (ROI) filter.

For each section/area where dwell-time needs to be determined and computed, and where individuals in a Watchlist need to be recognized, one or more cameras are deployed. One or more workers 120, 135 can obtain video feed from each of these camera(s) and compute the dwell-time for individuals in that section/area along with recognizing individuals in the Watchlist(s).

In a non-limiting exemplary embodiment, one or more cameras 130 and one or more personal computing devices 135 can monitor a specified area 201 with defined boundaries, and be in communication with a designated worker 120. The cameras 130, personal computing devices 135, and worker 120 monitoring the same area 201 can be designated section 1, such that worker-1, cameras-(1–N), and personal computing devices-(1–K) make up section-1. Similarly, the cameras 130, personal computing devices 135, and worker 120 monitoring the same area 202 can be designated section-2, such that worker-2, cameras-(1–M), and personal computing devices-(1–L) make up section-2. Cameras 130, personal computing devices 135, and worker 120 monitoring another area 202 can be designated section-R, such that worker-R, cameras-(1–S), and personal computing devices-(1–T) make up section-R. Etc.

Objects (e.g., people) moving from one area (e.g., 201) to an adjacent area (e.g., 203) can be monitored by a group of cameras 130, 135 in a first section directed at the first area, and then monitoring can be passed to a second group of cameras in a second section directed at the adjoining area. People moving from the first area to the second area or vice versa can be transferred between the monitoring sections. The individual can be automatically tracked as he or she moves across the fields of view of different cameras and from one area to another. Monitoring and tracking people can include using face detection, and tracking and matching of individuals seen across the different cameras.

In various embodiments, the overall system 100 can implement multiple applications, together forming a usecase. Instances of these applications are created and interconnected appropriately, forming a usecase topology. A usecase topology can include:

a video sensor that is configured to receive and process video frames;

a facial-recognition application that performs facial recognition;

a dwell-time application that calculates dwell times for each individual;

an alert manager that notifies a user that an individual has been recognized and/or that an individual has exceeded a dwell-time threshold for a location; and a biometrics manager that maintains the watchlist(s) and/or database(s) associated with facial recognition images, for example, storage of faces being watched for as well as storage of faces of individuals that have exceeded the dwell-time threshold for a region/area.

In various embodiments, a worker calculates a dwell time once an individual has left a particular region/area.

In various embodiments, a separate instance of a usecase is created and run for each individual object in the regions/areas being monitored by the video analytics system 100. An instance of a usecase can be created and run on a worker 120 for each separate object identified in the area being monitored by the specified section.

In various embodiments, among the application instances forming the usecase topology, alerts-manager and biometrics manager instances can be marked as 'uniqueSiteWide' and dwell-time instance can be marked as 'uniqueNodeWide'. For instances which are marked as 'uniqueSiteWide', only a single instance is created across site-wide deployment and reused by all usecase instances. For instances which are marked as 'uniqueNodeWide', only a single instance may be created on a particular node/worker and reused by all usecase instances for that node/worker. In various embodiments, instances of alerts-manager and biometrics-manager are run on the master controller, while instances of video-sensor, face-recognition and dwell-time are run on workers.

Biometrics-Manager instance provides Representational State Transfer (REST) Application Programming Interfaces (APIs) for managing Watchlist(s) and people in the Watchlist(s), and can maintain a database to store all people and Watchlist(s) details.

Examples of details for people can include: names of people (first name, last name, etc.), any metadata associated with them (e.g. gender, age, contact details, comments, etc.), their pictures, features, time when they were uploaded, a unique Id for each person and pictures, etc. Examples of details for a watchlist can include: the name of watchlist, a unique Id for each watchlist, a textual description for the watchlist(s), any icon associated with the watchlist, the color code(s) for the watchlist, etc. Each watchlist can have a color associated with it e.g. VIP watchlist can have "green", whereas DO NOT ADMIT (DNA) can have "red". This way different watchlists can be differentiated and shown on a user interface (UI) with the color associated with the watchlist. This color can be configurable for each watchlist.

In various embodiments, the various functions supported by Biometrics-Manager through REST APIs can include: (1) the ability to add, update, and remove watchlist(s); (2) the ability to turn monitoring of the Watchlist(s) On and Off; (3) the ability to add, update, and remove people from the Watchlist(s); (4) the ability to search for a particular person in a Watchlist using the name or image of the person; and (5) the ability to merge/reconcile records/entries for the same person in a single Watchlist and/or across multiple Watchlists.

In various embodiments, a search request for an individual can check to see if a person with a particular name is stored in the watch list(s), and if found, load the facial images and/or features for display.

In various embodiments, a Video-Sensor instance is an application that can connect a worker 120 to a camera 130 through a video interface 123, and can retrieve a camera feed and provide video frames as output.

In various embodiments, a Face-Recognition instance is an application that can connect to output from the video interface 123 and video-sensor application, retrieve the video frames, perform facial recognition on the video frames, and provide detected/recognized faces as output.

In various embodiments, a Dwell-Time instance is an application that can receive detected/recognized faces from various running instances of the Face-Recognition application in the particular section/area, track individuals across cameras in the section/area, and after they have left the section/area, compute a dwell-time within the particular section/area for these individuals. Along with computing dwell-time for individuals in the section/area, the Dwell-Time instance(s) can also be configured to compare and match faces of these individuals with the facial data stored/enrolled in the Watchlist(s). Once dwell-time is computed and the matching of faces is performed, an alert can be sent out for the individual with the dwell-time of the person, along with the name of the person, if recognized. An individual can be automatically enrolled in a watchlist anonymously when seen at any camera for the first time.

In various embodiments, an Alerts-Manager instance is an application that can receive alerts from a Dwell-Time instance, write the alerts to an alerts database, and also communicate the alert(s) to another/third-party application to utilize or act upon.

In various embodiments, each application in the usecase topology can include one or more individual threads and functions forming an application topology. The individual threads can handle the input data stream and pass it on to successive function(s) in a chain. The functions can be separate processes that can transform in some way an input data stream received from an upstream input or process and pass the transformed data items/tuples to the next function in the chain.

Figure 3:
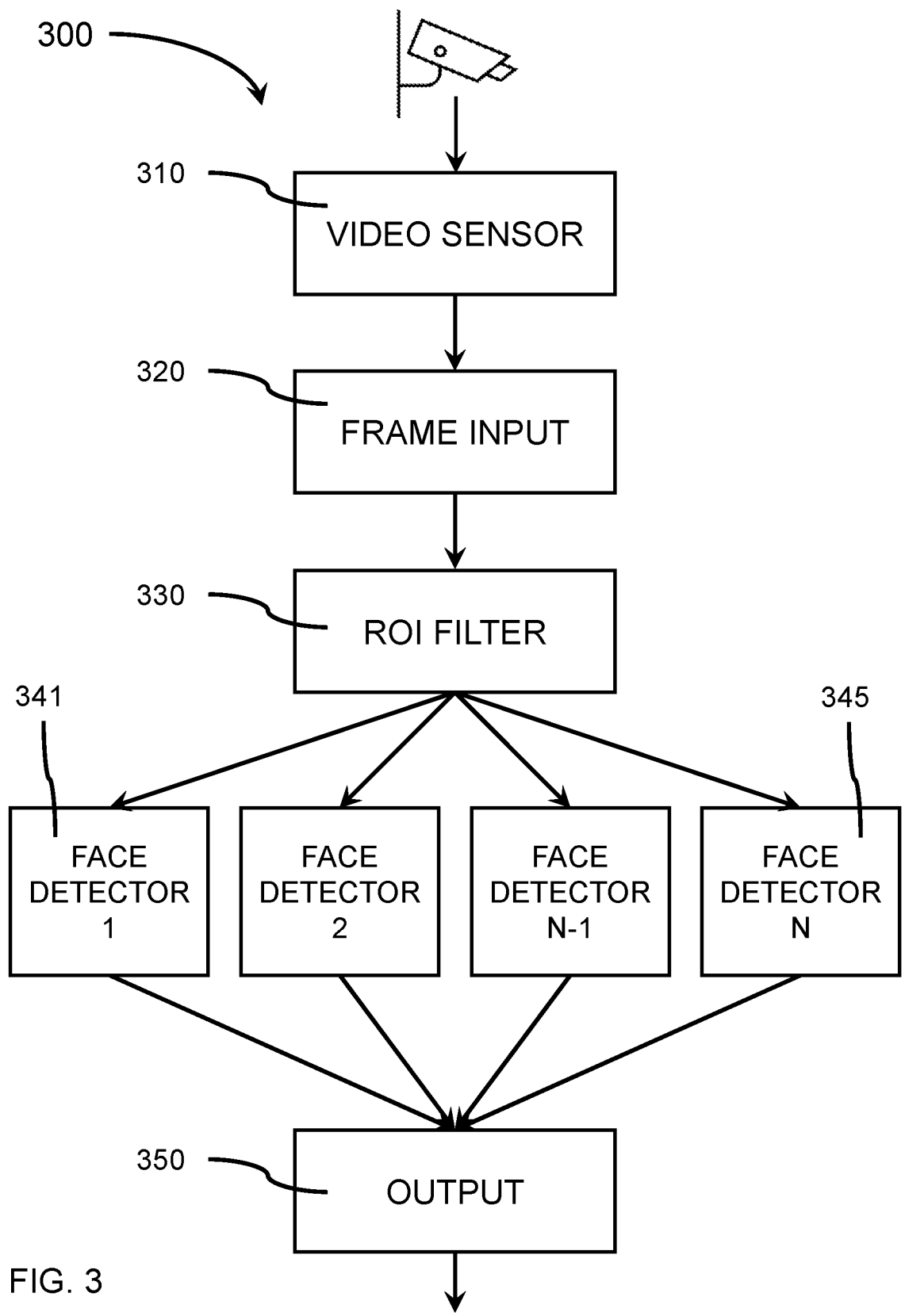
FIG. 3 is a block/flow diagram illustrating a system/method for facial recognition, in accordance with an embodiment of the present invention.

FIG. 3 is a block/flow diagram illustrating a system/method for facial recognition, in accordance with an embodiment of the present invention.

In various embodiments, a Facial-Recognition application topology 300 can receive video frames as input and emit detected faces as output.

At block 310, a Video Sensor application can connect to a video camera and receive and render video frames, and publish them as output for other applications to utilize, where the Video-Sensor can support connections to various types, makes and models of cameras.

At block 320, a Frame-Input can connect to an output from the Video-Sensor, and receive the video frames and pass them to a Region-of-Interest (ROI) Filter function using a Broadcast connection.

At block 330, a ROI-Filter function can receive frames from the Frame Input, and crop/filter out regions that are not of interest within the frame. The unwanted portion(s) of the frame can be discarded (thereby reducing the size of the frame for analysis), and emits the transformed frame, including only the region(s) of interest in the frame to a Facial Recognition function using, for example, a Shuffle connection.

At blocks 341-345, multiple instances of a Facial Recognition function running in parallel can receive a frame from ROI-Filter function, detect faces/facial features in the received frame, extract the features of the detected face(s) and emit them to an Output using Broadcast connection. A separate instance of a Facial Recognition function can be running for each detected object in an area.

At block 350, an Output function can receive detected faces along with extracted features from all of the parallel Facial Recognition function instances and publish them as output for other applications to utilize.

Figure 4:
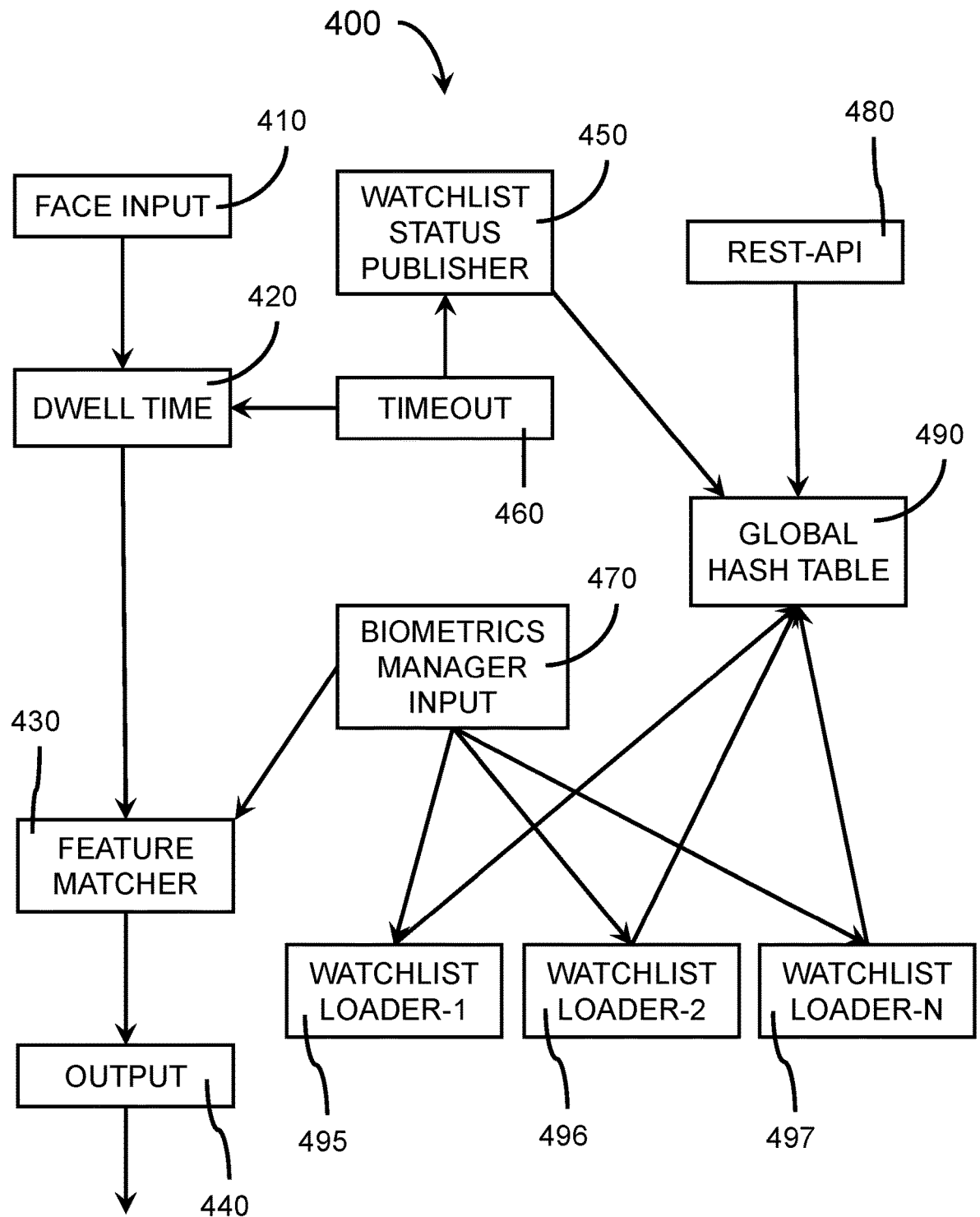
FIG. 4 is a block/flow diagram illustrating a system/method for dwell-time determinations, in accordance with an embodiment of the present invention.

FIG. 4 is a block/flow diagram illustrating a system/method for dwell-time determinations, in accordance with an embodiment of the present invention.

In various embodiments, a Dwell-Time application topology 400 receives faces from various face-recognition instances, tracks the detected faces across different cameras, and after individuals have left a section/area, computes a dwell-time for them, while also doing face matching and recognition of individuals who are registered/enrolled in the Watchlist(s). The dwell-time calculations and face matching can be conducted in parallel by a processor 125 in a worker 120 or personal computing device 135. A separate instance of a dwell-time calculation function can be running for each detected object in an area.

At block 410, a Face-Input can receive detected faces along with their extracted features as input, and emit them to a Dwell-Time function using a Broadcast Connection.

At block 420, a Dwell-Time function can receive detected faces from face-detection instances, track them across various cameras, and after individuals have left the section/area, compute dwell-time(s) for individuals and emit the individual details including pictures, features, dwell-time, etc. to a Feature-Matcher function using a Broadcast connection.

At block 430, a Feature-Matcher function can receive the dwell-time of individuals along with details of the detected face(s), including the picture and feature(s), and compare the face with the facial images registered/enrolled in the Watchlist(s), and emits the dwell-time of the individual in the particular area/section with (if match found) or without (if match NOT found) the name of the individual to an Output function using a Broadcast connection.

At block 440, an Output function can receive the dwell-time of the individual, along with the name, if matched with anyone in the Watchlist(s), from the Dwell-Time function 430 and communicate it to an Alerts-Manager.

At block 450, a Watchlist-Status-Publisher function periodically retrieves the loading status of the Watchlist(s) and publishes them for other applications to utilize. Other applications can use the status information to know whether the loading of the entire watchlist is completed or not, and based on that, the application(s) can decide whether to issue any query or not.

At block 460, a Timeout monitor periodically sends a trigger message to the Dwell-Time function 420 and Watchlist-Status-Publisher function 450 to refresh the Watchlist-Status-Publisher function 450 and/or Dwell-Time function 420, where the Timeout monitor can include a clock function. The interval for the trigger is configurable, where a trigger interval period can be in a range of about 5 seconds (sec) to about 60 sec, or about 10 sec to about 30 sec, or about 10 sec, although other trigger interval periods are also contemplated. Dwell-Time function 420 can compute and emit the dwell time for individuals when the trigger from the Timeout monitor 460 is received. The Watchlist-Status-Publisher 450 can publish the loading status of watchlist(s) when the trigger from the Timeout monitor 460 is received.

At block 470, a Biometrics-Manager Input can submit a Watchlist(s) loading request to the Watchlist-Loader function instances using a Shuffle connection, where the Biometrics-Manager Input can also connect to the Biometrics-Manager, receive notification(s), and communicate the notification(s) to the Feature-Matcher function 430 using a Broadcast connection. Feature-Matcher function 430 can use the Biometrics-Manager Input to have up-to-date watchlist information, which can be used to perform face matching.

At block 480, a REST-API process can handle requests for searching—if a particular individual is loaded in the system. All person-related details and loading status of the Watchlist(s) is maintained by the Dwell Time topology 400 in a global hash table 490. The hash table can maintain a log of loading status, and whether watch list loading is complete or in progress, when other functions request the status information.

At block 490, a global Hash Table can store all the person related details and the loading status of Watchlist(s) being maintained by the Dwell-Time topology 400.

At blocks 495-497, one or more instances of the Watchlist Loader function running in parallel can send Watchlist Loading requests for the same or different Watch lists. Watchlist-Loader function instances can connect to the Biometrics-Manager instance 470 to download Watchlist(s) along with people details in the Watchlist(s), including their names, pictures, features, etc. and emit them to the Feature-Matcher function using a broadcast connection. The status of loading of Watchlist(s) is maintained by Watchlist-Loader function(s) 495-497 in the global hash table 490.

Figure 5:
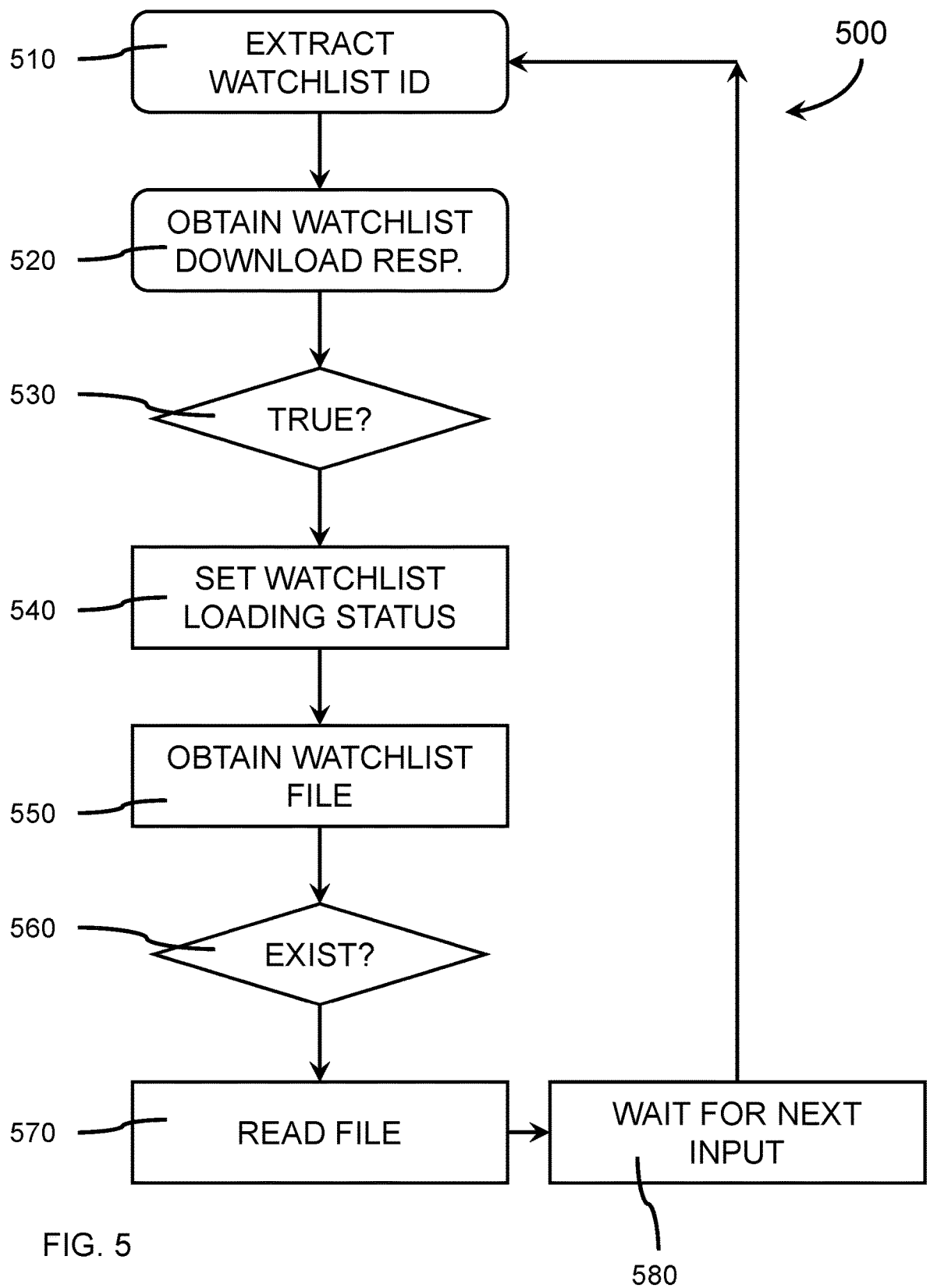
FIG. 5 is a block/flow diagram illustrating a method for watchlist loading procedure, in accordance with an embodiment of the present invention.

FIG. 5 is a block/flow diagram illustrating a method for watchlist loading procedure, in accordance with an embodiment of the present invention.

In various embodiments, a Watchlist Loader instance 500 can download one or more selected Watchlists from third parties.

At block 510, the Watchlist-Loader-Function instance first extracts the Watchlist Id from an input and tries to download the Watchlist.

At block 520, a watchlist download response is received from a third party contacted to download the Watchlist.

At block 530, the watchlist download response is checked to see if there was a successful download of the requested Watchlist(s).

At block 540, the Watchlist Loading Status is set. If the download response is True, then the status of loading watchlist is set to "success", otherwise the status is set to "warning".

At block 550, a Watchlist-Loader-Function instance then obtains the Watchlist file. The file is created locally on the worker as part of the download process. If the download response is "success", that means the file with all the watchlist related details (people, their pictures, features, etc.) is present locally in the file on the worker. This file can have different extensions depending on how the download process proceeds.

At block 560, the Watchlist-Loader-Function instance checks if the Watchlist file exists or not.

At block 570, if the Watchlist exists, then the Watchlist-Loader-Function instance reads the Watchlist file and emits the records to Feature-Matcher Function instances using a Tag connection.

At block 580, the Watchlist-Loader-Function instance then continues to wait for a next input. If a Watchlist file is not found, then the status of Watchlist loading is set to "error" and Watchlist-Loader-Function instance continues to wait for next input.

Figure 6:
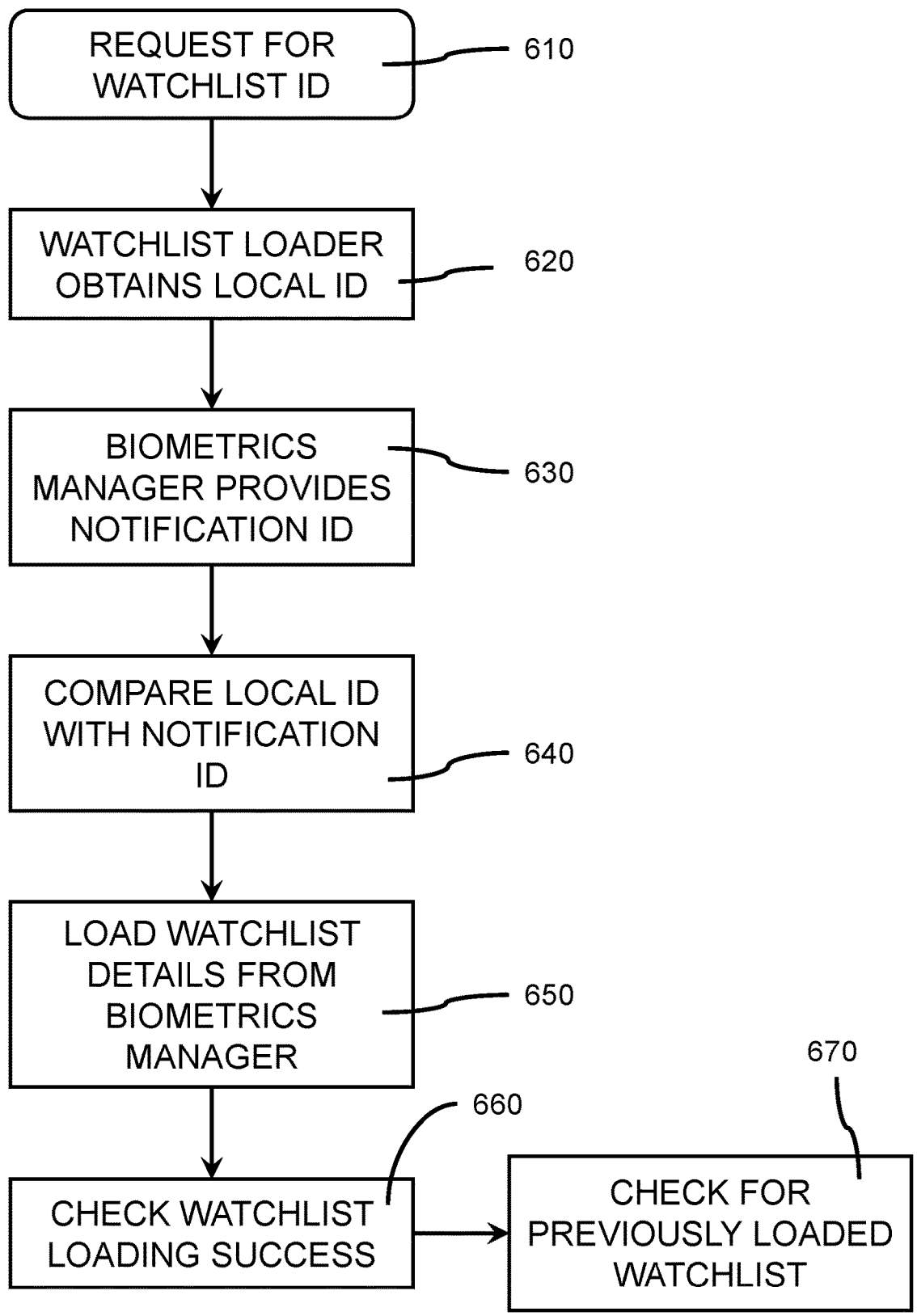
FIG. 6 is a block/flow diagram illustrating a method for watchlist downloading, in accordance with an embodiment of the present invention.

FIG. 6 is a block/flow diagram illustrating a method for watchlist downloading, in accordance with an embodiment of the present invention.

At block 610, a request for downloading a particular Watchlist Id is received.

At block 620, upon receipt of request for downloading the particular Watchlist Id, a Watchlist-Loader-Function instance initially obtains Local Notification Id, in the saved file on the worker, if it exists, otherwise marks Local Notification Id as −1. This Local Notification Id is the latest notification Id for the Watchlist, which was downloaded previously.

At block 630, after obtaining the Local Notification Id, the latest Notification Id for the Watchlist on the Master controller is obtained from the Biometrics-Manager.

At block 640, the Notification Ids are then compared and matched. If the Local Notification Id from the Worker and the Notification Id on the Master controller are the same, then there is no need to download again since the Watchlist is already downloaded on the Worker and Watchlist-Loader-Function instance returns True.

At block 650, if the Notification Ids do not match, then Watchlist details are loaded from the Biometrics Manager, including a Watchlist name, color code (e.g., red for warning, green for accepted), and any other metadata associated with the Watchlist. Different watchlists can be differentiated and shown on a user interface (UI) with the color associated with the watchlist. The color can be configurable/assignable for each watchlist.

At block 660, a check is then performed to see if loading Watchlist details from the Biometrics-Manager was successful or not.

At block 670, if the loading was not successful then the Watchlist-Loader-Function instance checks if any previously downloaded file for the Watchlist exists. If one exists, then Watchlist-Loader-Function instance returns False, signifying that the loading was not successful and uses the previously downloaded file.

If there is no previously downloaded file, then Watchlist-Loader-Function instance writes an Error File with the Watchlist Id and returns False. This Error File signifies that the loading of Watchlist wasn't successful and needs to be re-tried later.

Figure 7:
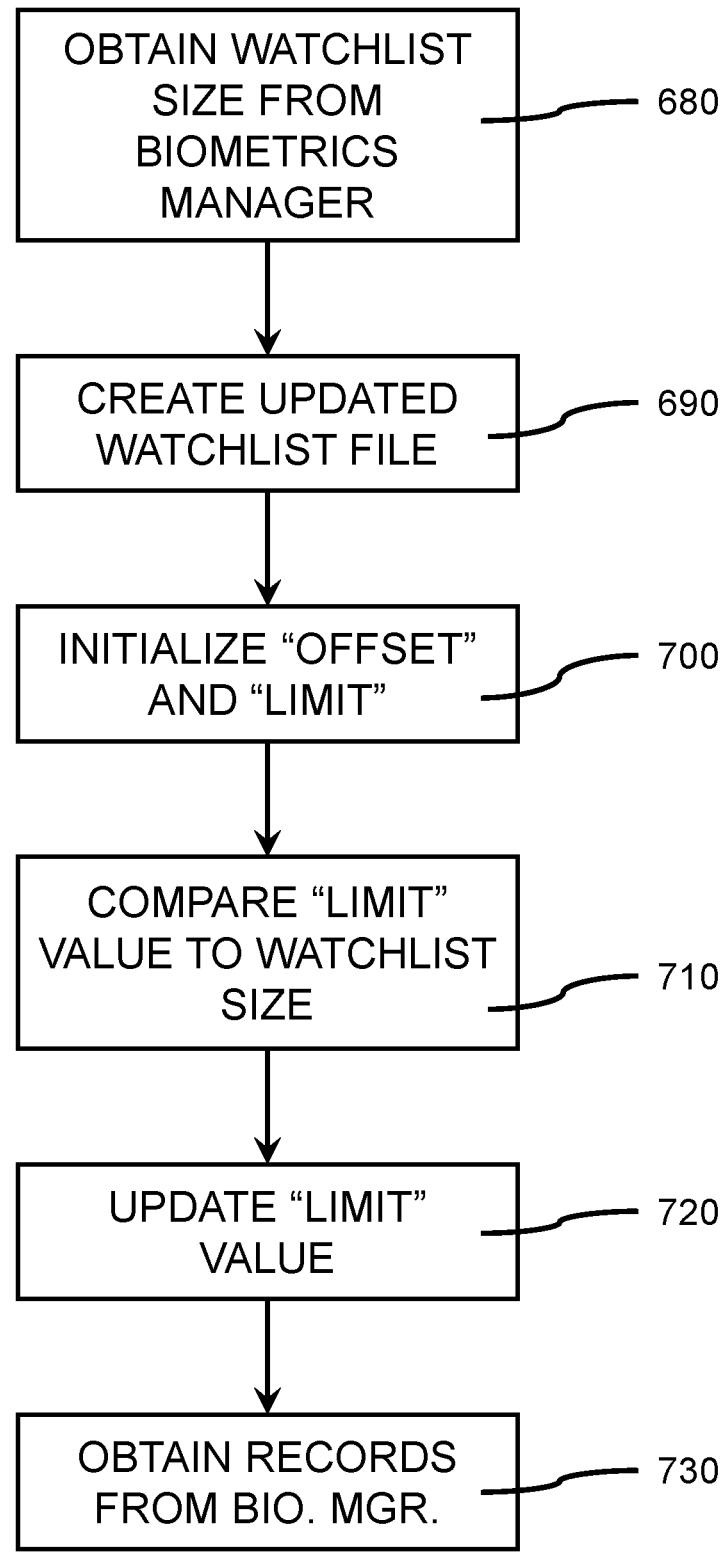
FIG. 7 is a block/flow diagram illustrating a continuation of the method for watchlist downloading from FIG. 6, in accordance with an embodiment of the present invention.

FIG. 7 is a block/flow diagram illustrating a continuation of the method for watchlist downloading from FIG. 6, in accordance with an embodiment of the present invention.

At block 680, if the Watchlist details are loaded successfully, then Watchlist Size is obtained from Biometrics-Manager. This size is the total number of people registered in the Watchlist. Watchlist-Loader-Function instance checks if the size was obtained successfully or not. If the size was not obtained, then it jumps to checking if any previously downloaded file for the Watchlist exists.

At block 690, if the size was obtained successfully, then another file including the Watchlist Id and ending with a ".updated" extension is created and latest notification Id obtained from master is noted in the file.

At block 700, two variables: 'offset' and 'limit', are initialized to 0 and 20 (this is the batch-size, which can be set to any other value, if desired) respectively. For example, if there are 100 people in the watchlist, an offset 0 and limit 20 means that the batch size is 20 i.e. 20 people will be downloaded in one batch. So, if there are 100 people then the download will happen in 5 batches. First batch 0-20, second batch 21-40, third batch 41-60, fourth batch 61-80 and fifth batch from 81-100. At the end of fifth batch all 100 people from the watchlist will have been downloaded.

At block 710, a check is performed to see if 'limit' is greater than Watchlist size. If 'limit' is not greater than Watchlist size, then Watchlist-Loader-Function jumps to obtaining a 'limit' number of records from Biometrics-Manager starting with the current 'offset'.

At block 720, if 'limit' is greater than Watchlist size, then Watchlist size is assigned to 'limit'.

At block 730, the Watchlist-Loader-Function obtains a 'limit' number of records from Biometrics-Manager starting with the current 'offset'. A check is performed to see if the records were successfully obtained or not. If the records were not obtained, then Watchlist-Loader-Function instance jumps to checking if any previously downloaded file for the Watchlist exists. If the records were obtained successfully, then they are written in the File. Once a batch of records is obtained, the offset is then increase by 'limit' and size is reduced by 'limit'. Watchlist-Loader-Function instance checks if the size is greater than 0. If it is greater than 0, i.e. there are more records to download, then it jumps to obtaining 'limit' number of records from Biometrics-Manager starting with the current 'offset'.

If the size is not greater than 0 i.e. all records are downloaded, then the file created with ".updated" extension is renamed to file with just the Watchlist Id in the name and Watchlist Loader-Function instance returns "True."

In various embodiments, a Biometrics Manager Input checks if any Watchlist error files exist. If any are located, then the next Watchlist Error file is obtained, and the Watchlist is (re)tried to download using the Watchlist Download procedure. If the Watchlist is successfully downloaded, then the error file is removed and 'download' watchlist notification is added. If the Watchlist is not downloaded successfully, then the next error file is obtained until no more error files exist.

In various embodiments, after trying to re-download Watchlist(s), which failed to download previously, the Biometrics Manager Input then obtains a local notification ids for all Watchlists. Each transaction on the watchlist (related to watchlist or people in the watchlist or pictures of people in the watchlist) generates a notification id. The master has the most up-to-date notification Id with the most recent transaction on the watchlist. On the worker, there will be a local notification id, indicating that the worker has details up to that "local notification id". When a previous download had failed, the worker will know that it has details up to the "local notification id" and then it will try to fetch all details starting from that "local notification id". For example, the master could be at notification Id 100, but worker could be at "local notification id" say 92. In this case the worker will start from 93 and fetch up to 100 to be in synch with the watch list on the master controller. These notifications are related to addition/update/removal of Watchlist/Person. Local notification Id is then updated to the most recent notification id, if notifications were found and added.

Once all notifications for Watchlist(s) are added, Biometrics-Manager-Input instance then obtains the current local notification ids for all watchlists. For each Watchlist, it checks if "Synch" notification was sent for the watchlist. If it was sent, then next Watchlist is checked, otherwise, Biometrics-Manager-Input instance checks if the watchlist is in synch with the Master i.e. the local notification Id and the most recent notification on master obtained from Biometrics-Manager are the same, then 'synchronized' Watchlist notification is added.

After adding 'synchronized' Watchlist notification, Biometrics-Manager-Input instance deletes Watchlist files for all the Watchlist(s) that were removed. If notifications were found to be added while following the above procedure, then they are processed one by one, and either emitted to Feature-Matcher-function or Watchlist-Loader function or processed locally. Notifications to 'download' Watchlist are sent to Watchlist-Loader-Input instances, while all other notifications, except notification(s) for 'synchronized' watchlists, are sent to Feature-Matcher function. Notification which has 'synchronized' Watchlist is locally processed by Biometrics Manager-Input-instance and the loading status of Watchlist is updated to 'success' in global hash table. If no notifications exist or after processing all notifications, Biometrics-Manager-Input instance sleeps for a specified time interval and then jumps to checking if any watchlist error files exist, and continues to obtain and process notifications from Biometrics-Manager.

A Dwell-Time function first checks whether the input contains a "feature", which is a signature for the face detected by face-detection instance and sent as part of the input to Dwell-Time instance. If the input does not contain a "feature", then Dwell-Time function jumps to the input being a trigger from the Timeout input to compute and emit dwell-time of individuals.

If the input contains a "feature", then Dwell-Time function verifies whether the feature is valid or not by comparing the "feature" with itself and checking if the match score is high enough, thereby confirming that the feature is valid and can be used for comparing and matching faces. If the score is not high enough i.e. the feature is invalid, then the Dwell-Time function advances to the next step of waiting. Dwell-Time function waits for the next input.

After checking the validity of the "feature", the Dwell-Time function, then checks if the received face is adequate or not i.e. whether the width and height of the received face picture is beyond a certain pre-determined threshold for width and height and whether the quality of the received face is greater than a pre-determined threshold for quality. If the width, height and quality of the face are greater than the respective thresholds, then the face is considered adequate. If either the width, height or quality is less than the threshold, then the face is discarded and Dwell-Time function returns to waiting for the next input.

Once the "feature" is validated and the face is considered to be adequate, Dwell-Time function retrieves the sensor Id from the input. This sensor Id corresponds to the camera, where the individual was detected.

Dwell-Time function then checks whether the received face was already seen at the particular sensor Id by comparing it with previously detected faces at that sensor. If the face wasn't seen at that sensor id, then Dwell-Time function checks whether the received face was seen at any other sensor Id in the particular section/area.

If the face was already seen at that sensor Id before, then Dwell-Time function updates the last seen timestamp for the face at the particular sensor id.

Dwell-Time function checks whether the received face was seen at any other sensor Id in the particular section/area by comparing it with previously detected faces across all other sensors covering the particular section/area. If the face was not seen at any of the sensors, then Dwell-Time function adds the new face and Id to the watchlist(s).

If the face was seen at some other sensor, then Dwell-Time function updates the mapping for the face with different sensors that the face was seen at and adds the current sensor Id to the list of sensors that the face was seen at, including the timestamp when the face was seen.

After Dwell-Time function has checked and verified that the face was not previously seen at any of the sensors, a new face is added along with the time stamp when the face was first seen and the mapping of face and sensors is updated for the newly seen/added face. Dwell time maintains a cache with the faces seen across different sensors/cameras along with the timestamp, and the face is added to this cache.

If the input does not contain "feature", then the input is a trigger from Timeout to compute and emit dwell-time of individuals. The Dwell-Time function checks if there are faces seen at various sensors and checks if dwell-time needs to be computed for any of these faces one by one. When all faces are checked, Dwell-Time function removes all the expired faces i.e. faces of individuals who have left the particular section/area.

Dwell-Time function obtains the next face to check if the dwell-time needs to be computed for the individual.

Once the face is obtained, Dwell-Time function retrieves the last seen timestamp for the face across all the sensors covering the particular section/area.

Dwell-Time function then checks if the time interval between the last seen timestamp and current time is greater than a certain pre-determined delay threshold. If it is not greater than the delay threshold, then it is not yet time to compute dwell-time for the individual and Dwell-Time function computes and emits dwell-time of individuals. If it is not yet time, then dwell time will not be computed and emitted, since the person may still be present in the area. When the time is greater than certain pre-determined delay threshold, that indicates that the person may have left the area, and this is when the dwell time will be computed and emitted.

If the time interval between the last seen timestamp and current time is greater than a certain pre-determined threshold, the face is considered expired i.e. the individual has left the particular section/area. Dwell-Time function then computes the dwell-time for the individual by taking the difference between the last seen timestamp and the first seen timestamp for the individual across all sensors/cameras covering the particular section/area.

After checking all the faces, Dwell-Time function removes all the expired faces i.e. faces of individuals who have left the particular section/area. This will be removed from the cache mentioned above.

The mapping between the faces and sensors i.e. which faces have been seen at which sensors and the timestamp, etc. is updated after removal of the expired faces.

The Dwell-Time function then waits for next input.

A Feature-Matcher function first extracts requested action from the input.

A check is performed to see if the action is 'Add' or 'Update'.

If action is add/update, then Feature-Matcher function checks if the input contains 'PersonId'.

If 'PersonId' is present in the input, then person details are added/updated based on the request.

Feature-Matcher function then waits for the next input.

If the input does not contain 'PersonId', then Feature-Matcher function updates the Watchlist details.

If the action is neither 'Add' nor 'Update' then check is performed to see if the action is 'Remove'.

If action is 'Remove', then Feature-Matcher function checks if the input contains 'PersonId'.

If 'PersonId' is present in the input, then person details are removed.

Feature-Matcher function then waits for the next input.

If the input does not contain 'PersonId', then Feature-Matcher function removes the Watchlist.

If the action is neither add/update/remove, then the input contains a face to match. Feature-Matcher function then validates the face and checks if the features of the face, match with itself with a score above a threshold. If it does not match, then Feature-Matcher function discards the request and waits for next input.

If the face is validated, then Feature-Matcher function initializes three variables i.e. max_score, person_id and picture_id to −1.

A check is then performed to see if face features to match exist.

If features to match exist, then next face feature along with its watchlist status is obtained.

A check is performed to see if the Watchlist is 'active'. If Watchlist is NOT 'active', then Feature-Matcher function goes back to step 14.

If Watchlist status is 'active', then match threshold is obtained.

A Face Match is performed next and a similarity score between the face received in input and the face to match is obtained.

A check is performed to see if the score is greater than max_score and if the score is greater than match threshold. If the score is less than max_score and less than threshold, Feature-Matcher function then performs a check to see if the face feature exists.

If the score is greater than max_score and greater than the match threshold, then max_score, person_id and picture_id are updated and Feature-Matcher function performs a check to see if more features to match exists. The face will be matched against all the face features in the watchlist to see if a match is found or not.

When there are no more features to match, a check is performed to see if the max_score after matching with all the features, is greater than −1.

If the max_score is greater than −1, that means that a match was found and the max_score along with person-id, picture-id and Watchlist details are emitted to a Combiner-function.

If the max_score is not greater than −1, that means no match was found. Feature-Matcher function in this case emits −1 as max_score to Combiner function.

After processing the input, performing the match against all features, the Feature-Matcher function then waits for a next input.

Figure 8:
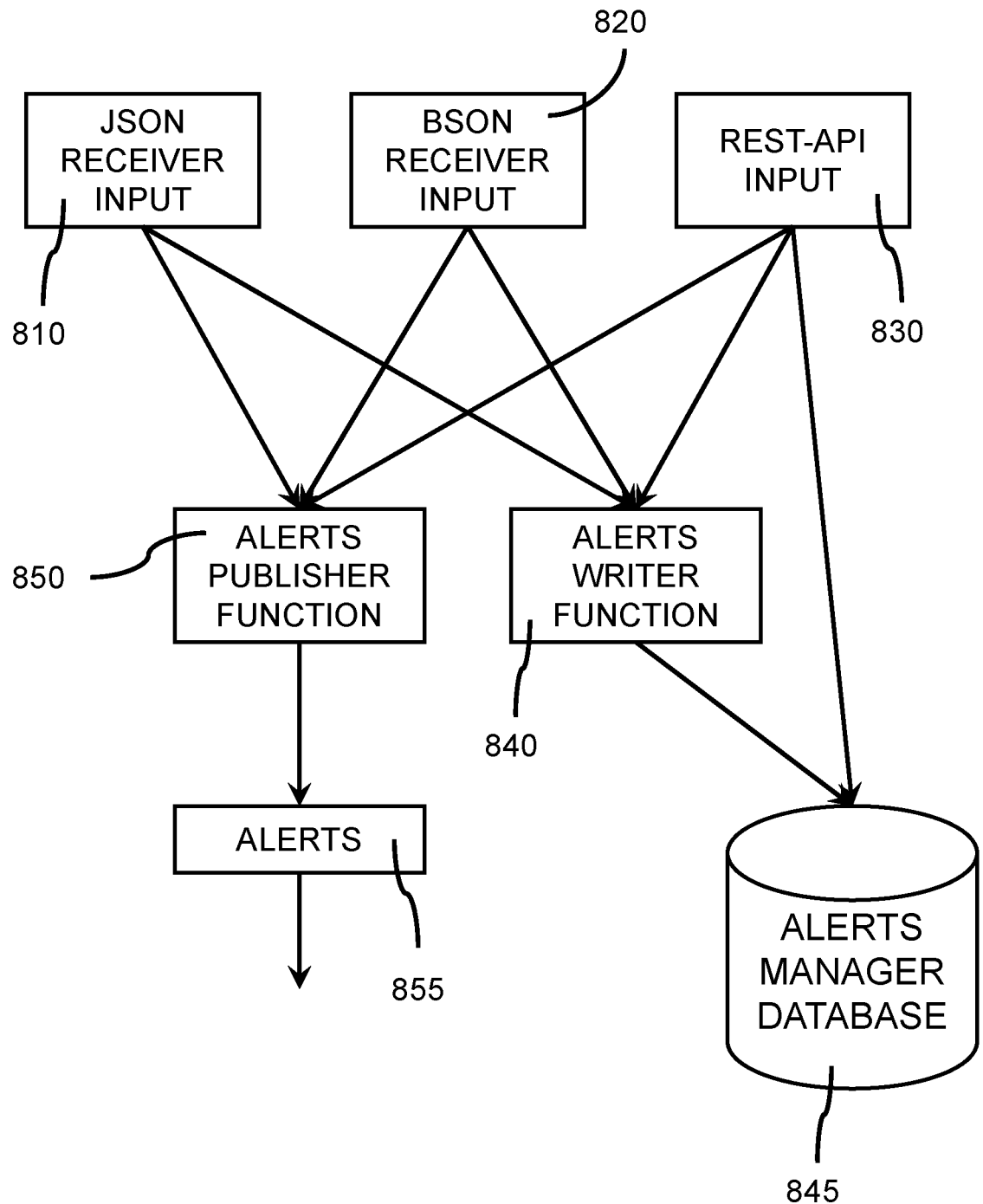
FIG. 8 is a block/flow diagram illustrating an Alerts-Manager application topology, in accordance with an embodiment of the present invention.

FIG. 8 is a block/flow diagram illustrating an Alerts-Manager application topology, in accordance with an embodiment of the present invention.

At block 810, a JSON-Receiver input receives alerts in JSON format and emits them to an Alerts-Writer function and Alerts-Publisher function using a Broadcast connection.

At block 820, a BSON-Receiver input receives alerts in BSON format and emits them to an Alerts-Writer function and Alerts-Publisher function using a Broadcast connection.

At block 830, a REST-API input receives request to either "add" new alerts or "retrieve" historical alerts. For "add" requests, it emits them to an Alerts-Writer function and Alerts-Publisher function using a Broadcast connection. For "retrieve" requests, it connects to the database, retrieves the historical alerts, and responds back with the retrieved alerts.

At block 840, an Alerts-Writer function receives the alerts and writes them into a database 845, where all alerts are stored for specified duration of time.

At block 850, an Alerts-Publisher function receives the alerts 855 publishes them for other applications/third-party to use.

Figure 9:
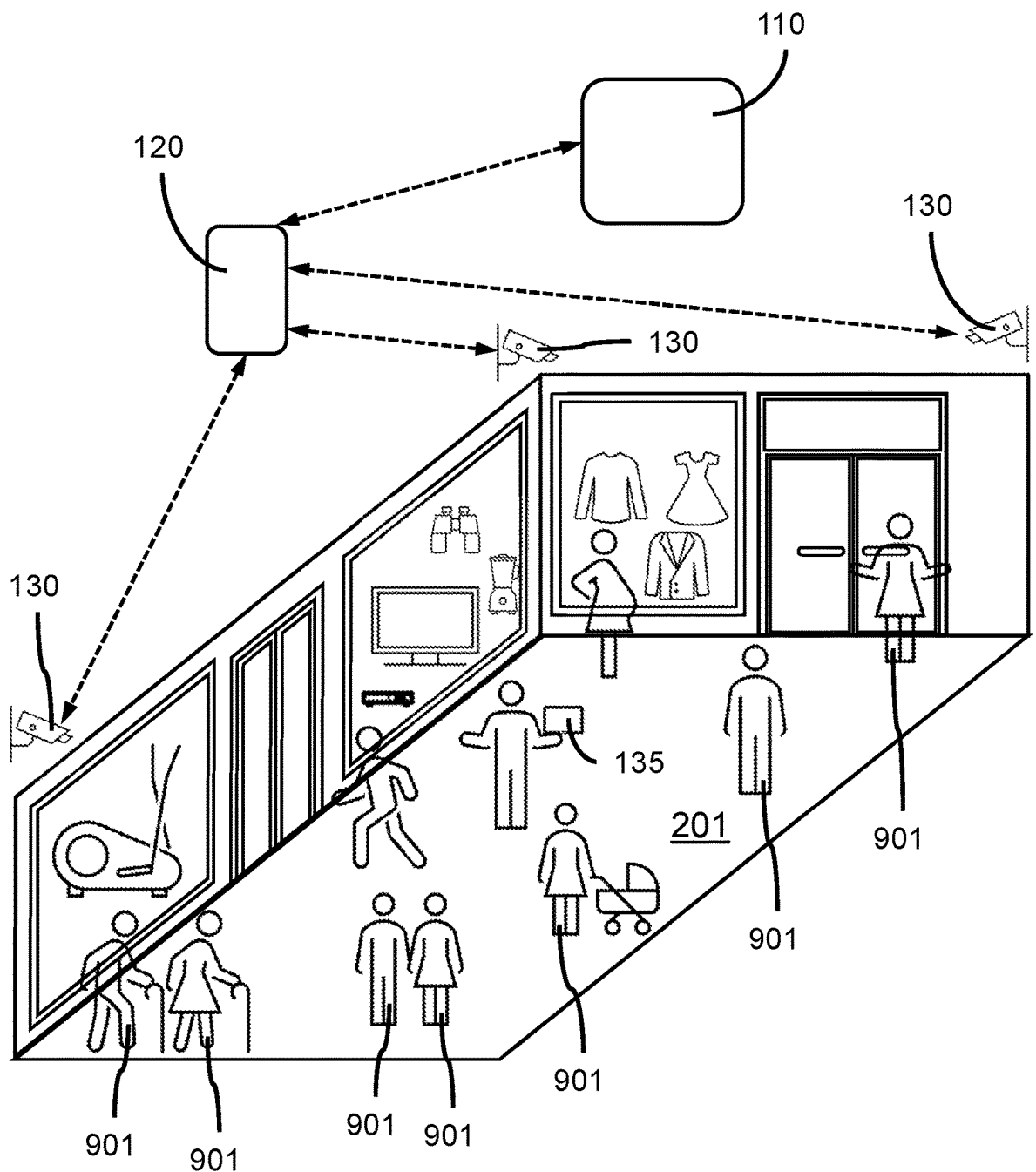
FIG. 9 is an illustration depicting people within an area monitored by a distributed streaming video analytics system, in accordance with an embodiment of the present invention.

FIG. 9 is an illustration depicting people within an area monitored by a distributed streaming video analytics system, in accordance with an embodiment of the present invention.

In various embodiments, camera(s) 130 and/or personal computing devices 135 can be used to monitor an area 201 where different people 901 can be present and engaging in different activities, such as shopping, strolling, or socializing. The camera(s) 130 and/or personal computing devices 135 can capture facial images and communicate them to a worker 120 that can perform facial recognition and/or dwell-time determinations. The captured facial features can be compared to a Master controller 110. The Master controller can maintain databases for dwell-time alerts and a Watchlist including facial recognition features.

In various embodiments, each worker 120, 125 can monitor people in the field of view of their associated camera(s) and determine their dwell times in a defined region. Object recognition can be used to determine the presence of a number of people in the defined area and monitor the movement of the objects within the defined area without also identifying the objects as a particular person through facial recognition. Facial recognition through images captured by the camera(s) during object detection and motion monitoring can be conducted in parallel object detection and motion monitoring. An anonymous person can be monitored for dwell time in the defined area.

Figure 10:
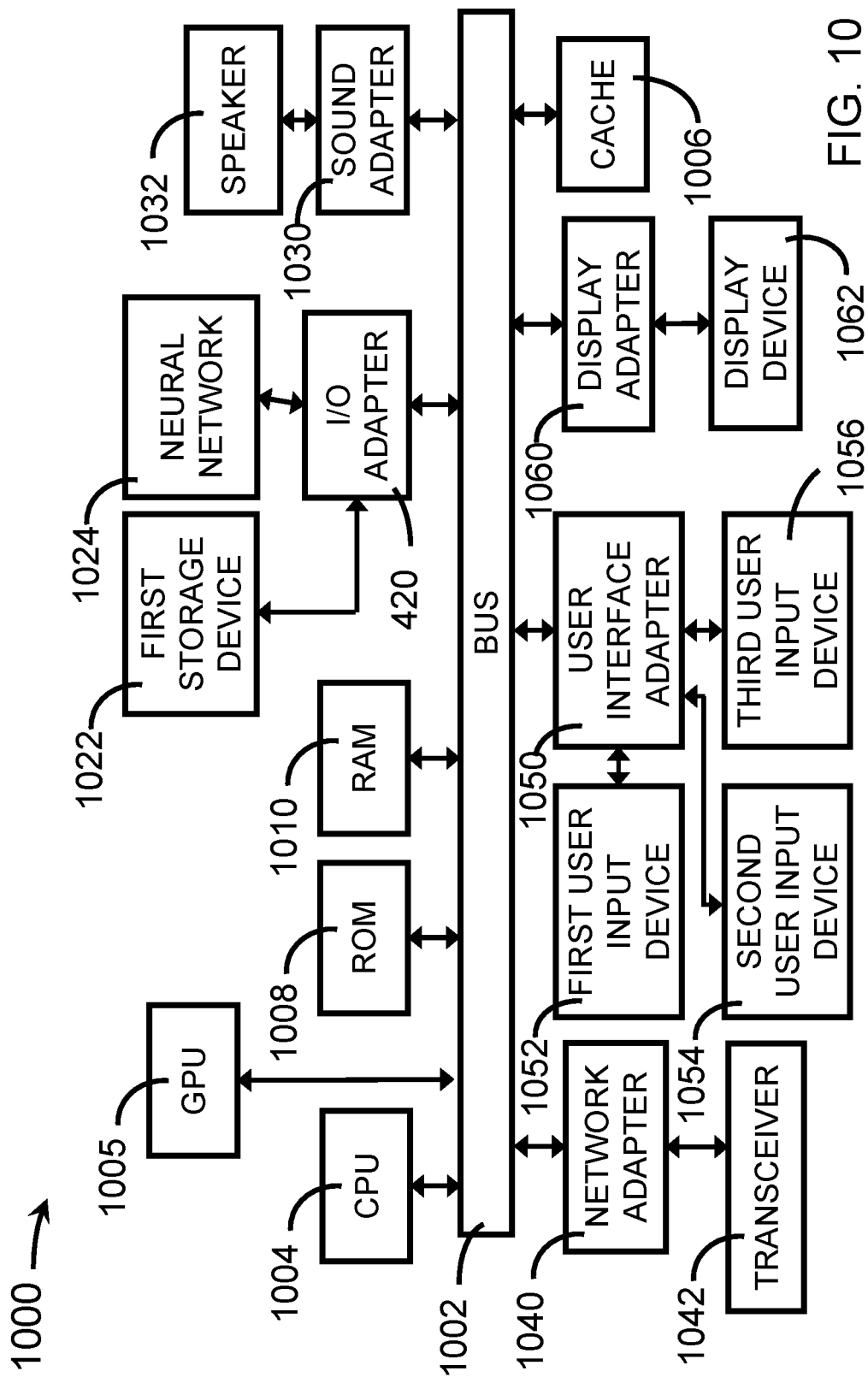
FIG. 10 is an exemplary processing system to which the present methods and systems may be applied, in accordance with an embodiment of the present invention.

FIG. 10 is an exemplary processing system 1000 to which the present methods and systems may be applied, in accordance with an embodiment of the present invention.

The processing system 1000 can include at least one processor (CPU) 1004 and may have a graphics processing (GPU) 1005 that can perform vector calculations/manipulations operatively coupled to other components via a system bus 402. A cache 1006, a Read Only Memory (ROM) 1008, a Random Access Memory (RAM) 1010, an input/output (I/O) adapter 1020, a sound adapter 1030, a network adapter 1040, a user interface adapter 1050, and/or a display adapter 1060, can also be operatively coupled to the system bus 1002.

A first storage device 1022 and a second storage device 1024 are operatively coupled to system bus 1002 by the I/O adapter 1020, where a neural network can be stored for implementing the features described herein. The storage devices 1022 and 1024 can be any of a disk storage device (e.g., a magnetic or optical disk storage device), a solid state storage device, a magnetic storage device, and so forth. The storage devices 1022 and 1024 can be the same type of storage device or different types of storage devices.

A speaker 1032 can be operatively coupled to the system bus 1002 by the sound adapter 1030. A transceiver 1042 can be operatively coupled to the system bus 1002 by the network adapter 1040. A display device 1062 can be operatively coupled to the system bus 1002 by display adapter 1060.

A first user input device 1052, a second user input device 1054, and a third user input device 1056 can be operatively coupled to the system bus 1002 by the user interface adapter 1050. The user input devices 1052, 1054, and 1056 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1052, 1054, and 1056 can be the same type of user input device or different types of user input devices. The user input devices 1052, 1054, and 1056 can be used to input and output information to and from the processing system 1000.

In various embodiments, the processing system 1000 may also include other elements (not shown), as readily contemplated by one of skill in the art, as well as omit certain elements. For example, various other input devices and/or output devices can be included in processing system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1000 are readily contemplated by one of ordinary skill in the art given the teachings of the present principles provided herein.

Moreover, it is to be appreciated that system 1000 is a system for implementing respective embodiments of the present methods/systems. Part or all of processing system 1000 may be implemented in one or more of the elements of FIGS. 1-9. Further, it is to be appreciated that processing system 1000 may perform at least part of the methods described herein including, for example, at least part of the method of FIGS. 1-9.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for determining dwell time, comprising:
    receiving images of an area including a person from one or more cameras;
    detecting a presence of the person in the received images using a worker;
    receiving by the worker digital facial features stored in a watch list from a master controller;
    performing facial recognition and monitoring a dwell time within the area of the person after a predetermined time has assed since a last time the person was detected;
    determining that the person is in the watch list and has exceeded a dwell time threshold; and
    sending an alert to a third party, responsive to the determination that the person is in the watch list and has exceeded the dwell time threshold.

2. The method as recited in claim 1, further comprising:
    adding captured facial features of individuals that have exceeded the dwell time threshold and have not been identified by performing the facial recognition to the watch list.

3. The method as recited in claim 1, further comprising:
    downloading a particular watch list to the master controller using a particular watch list ID.

4. The method as recited in claim 1, wherein the watch list includes a plurality of facial images and individuals' names associated with the each of the plurality of facial images.

5. The method as recited in claim 1, wherein the dwell time for the person is calculated after each of the one or more people leaves the area.

6. The method as recited in claim 1, wherein the person is tracked moving between viewing fields of the one or more cameras.

7. A system for dwell time determination, comprising:
    a master controller having one or more processors and memory, the master controller including a watch list and an alerts manager stored in the memory;
    a worker having one or more processors and memory, wherein the worker includes a dwell time calculator and a facial recognition neural network executable by the one or more processors; and
    a plurality of cameras in communication with the worker, wherein the worker receives video images from the plurality of cameras and performs facial recognition and dwell time calculations for a person detected in a field of view of the plurality of cameras, wherein the worker receives images of an area including the person from the plurality of cameras, and performs facial recognition and monitoring of a dwell time within the area for the person after a predetermined time has passed since a last time the person was detected, and wherein the alerts manager sends an alert to a third party, responsive to the determination that the person is in the watch list and has exceeded the dwell time threshold.

8. The system of claim 7, further comprising a personal computing device in communication with the master controller, wherein the personal computing device has one or more processors and memory, wherein the personal computing device includes a dwell time calculator and a facial recognition neural network executable by the one or more processor.

9. The system of claim 7, wherein the master controller and worker are configured to add captured facial features of individuals to the watch list that have exceeded a dwell time threshold and have not been identified by the facial recognition.

10. The system of claim 7, wherein the dwell time for the person is calculated after the person leaves the area.

11. The system of claim 7, wherein the person is tracked moving between viewing fields of the one or more cameras.

12. The system of claim 7, wherein the master controller is configured to download a particular watch list based on a particular watch list ID.

13. The system of claim 7, wherein the worker is configured to receive digital facial features from the master controller stored in the watch list.

14. A non-transitory computer readable storage medium comprising a computer readable program for determining dwell time, wherein the computer readable program when executed on a computer causes the computer to perform:
receiving images of an area including a person from one or more cameras;
detecting a presence of the person in the received images using a worker;
receiving by the worker digital facial features stored in a watch list from a master controller;
performing facial recognition and monitoring a dwell time within the area of the person after a predetermined time has passed since a last time the person was detected; and
determining that the erson is in the watch list and has exceeded a dwell time threshold; and
sending an alert to a third party, responsive to the determination that the person is in the watch list and has exceeded the dwell time threshold.

15. The computer readable storage medium comprising a computer readable program as recited in claim 14, further comprising:
adding captured facial features of individuals that have exceeded the dwell time threshold and have not been identified by performing the facial recognition to the watch list.

16. The computer readable storage medium comprising a computer readable program as recited in claim 14, further comprising:
downloading a particular watch list to the master controller using a particular watch list ID.

17. The computer readable storage medium comprising a computer readable program as recited in claim 14, wherein the watch list includes a plurality of facial images and individual's names associated with the each of the plurality of facial images.

18. The computer readable storage medium comprising a computer readable program as recited in claim 14, wherein the dwell time for the person is calculated after the person leaves the area.

* * * * *